United States Patent [19]

Williams et al.

[11] Patent Number: 4,647,385

[45] Date of Patent: Mar. 3, 1987

[54] REDUCTION OF VISCOSITY OF AQUEOUS FLUIDS

[75] Inventors: Martin M. Williams; Martha A. Phelps; George M. Zody, all of Louisville, Ky.

[73] Assignee: Hi-Tek Polymers, Inc., Louisville, Ky.

[21] Appl. No.: 796,965

[22] Filed: Nov. 12, 1985

[51] Int. Cl.$^4$ .......................... E21B 43/26; C09K 7/02
[52] U.S. Cl. ................................ 252/8.551; 166/308; 252/8.511
[58] Field of Search ............ 252/8.55 R, 8.5 A, 8.5 C, 252/326; 166/308

[56] References Cited

U.S. PATENT DOCUMENTS

| | | | |
|---|---|---|---|
| 3,002,960 | 10/1961 | Kolodny | 252/8.55 X |
| 3,779,914 | 12/1973 | Nimerick | 252/315.3 X |
| 4,144,179 | 3/1979 | Chatterji | 252/8.55 R |
| 4,169,798 | 10/1979 | DeMartino | 252/8.55 |
| 4,250,044 | 2/1981 | Hiakel | 252/8.55 R |
| 4,464,268 | 8/1984 | Schievelbein | 252/8.55 B |
| 4,552,668 | 11/1985 | Brown et al. | 252/8.55 X |

OTHER PUBLICATIONS

Oil & Gas Journal, Dec. 12, 1983, pp. 96–101 Ken E. Davis and Malcolm D. Jarrell.

Primary Examiner—Herbert B. Guynn
Attorney, Agent, or Firm—Herbert P. Price

[57] ABSTRACT

The viscosity of thickened aqueous solutions of water-soluble polymers is reduced by the addition of alkali metal and alkaline earth metal salts of hypochlorous acid and tertiary amines. The combination of the salt and the tertiary amine is much more efficient in speed of reduction in viscosity and in the completeness of the degradation of the polymer than the use of the metal salt alone. The process of this invention is particularly useful in fracturing of oil wells.

7 Claims, No Drawings

REDUCTION OF VISCOSITY OF AQUEOUS FLUIDS

BACKGROUND OF THE INVENTION

The field of art to which this invention pertains is water-soluble polymers.

In certain industrial applications, it is desirable to suspend solids in aqueous fluids and then to allow the solids to settle out of the fluids. This can be done by using a water-soluble polymer to increase the viscosity and to thicken the fluid so that the solids will be suspended, and then to lower the viscosity so that the solids will drop out of suspension. This lowering of viscosity is accomplished by using "a breaker", which acts on the water-soluble polymer to reduce its molecular weight and to thin the fluid in which it is dissolved.

The breaking of gels or thickened aqueous fluids has been accomplished by using a variety of techniques, such as by the degradative action of acids, enzymes or mild oxidizing agents. In U.S. Pat. No. 4,464,268, sodium hypochlorite is described as being a drastic treating agent for degrading water-soluble polymers. Ammonium and alkali metal persulfates in combination with a tertiary amine are disclosed as being suitable as breaker systems for high viscosity fluids. The use of lithium hypochlorite as a breaker material is described in the *Oil and Gas Journal,* Dec. 12, 1983, pp. 96 to 101.

There is a constant effort to develop improved breaker systems which will degrade natural and synthetic polymers efficiently at ambient temperatures.

SUMMARY OF THE INVENTION

This invention relates to thickened or gelled aqueous fluids. In one aspect, this invention pertains to a process for reducing the viscosity of thickened or gelled aqueous fluids under controlled conditions. In another aspect, this invention relates to a process for reducing the viscosity of thickened or gelled aqueous fluids in a short time at a relatively low temperature.

By the process of this invention the viscosity of aqueous fluids containing natural or synthetic water-soluble polymers is reduced by adding to the aqueous fluid an alkali metal or alkaline earth metal salt of hypochlorous acid and a tertiary amine, wherein about 0.25 to about 25 parts by weight of metal salt and about 0.25 to about 25 parts by weight of tertiary amine are present for each 100 parts by weight of the water-soluble polymer. The rate of degradation and the completeness of the reaction is increased substantially by the use of a tertiary amine in combination with the hypochlorite versus the use of the hypochlorite alone.

This break system is useful in the drilling or treatment of oil and gas wells, e.g., for use in drilling fluids, fracturing fluids, and completion and workover fluids. It also is useful in many different types of industrial or waste treatment processes where a quick break or degradation of aqueous fluids of water-soluble polymers is desired.

DESCRIPTION OF THE INVENTION

Water-soluble polymers which are useful in the process of this invention are natural and synthetic polymers which are soluble or colloidally dispersible in aqueous fluids and which thicken the fluids. Such polymers are water-soluble synthetic polymers, water-soluble derivatives of cellulose, water-soluble polysaccharides, water-soluble derivatives of polysaccharides, and mixtures of these compounds.

Examples of suitable water-soluble synthetic polymers include polyacrylamide, polymethacrylamide, sodium polyacrylate, polyacrylic acid and copolymers of acrylic acid and acrylamide. Included among such polymers are polyacrylamides and polymethacrylamides which have been hydrolyzed such that from about 0 to about 70% of the amide groups have been converted to carboxyl groups and then are neutralized with ammonium or an alkali metal hydroxide.

Water-soluble derivatives of cellulose suitable for use in this invention include hydroxyethyl cellulose, carboxymethyl hydroxyethyl cellulose, carboxymethyl cellulose, methyl cellulose, ethyl cellulose and propyl cellulose.

Suitable water-soluble polysaccharides are guar gum, locust bean gum and gum tragacanth. Water soluble derivatives of these polysaccharides are also useful. Such derivatives include hydroxyethyl guar gum, hydroxypropyl guar gum, carboxymethyl guar gum and carboxymethylhydroxypropyl guar gum.

Other suitable water-soluble polymers include starch, sodium alginate, carogeenan, gum arabic, gum ghatti, gum karaya and microbial polysaccharides, such as xanthum gum.

The preferred gelling agents for use in this invention are polyacrylamide, polyacrylic acid, guar gum, hydroxypropyl guar gum and hydroxyethyl cellulose.

The water-soluble polymers are generally used in concentrations of about 0.1 to about 10 parts by weight of water-soluble polymer to 100 parts by weight of the aqueous liquid. At concentrations below about 0.1 part by weight of the water-soluble polymers per 100 parts by weight of the aqueous liquid, the resulting liquid does not have sufficient viscosity to achieve desired objectives. At concentrations above about 10 parts by weight of water-soluble polymer per 100 parts by weight of aqueous liquid, the resulting composition is generally of such a high viscosity that it cannot be used efficiently. In the trade, the amount of water-soluble polymer that is used is generally expressed as pounds per 1000 gallons of solution. Expressed in this manner, the useful amounts of water-soluble polymers will vary from about 20 to about 80 pounds per 1000 gallons of solution.

The alkali metal and alkaline earth metal salts of hypochlorous acid useful in this invention are magnesium hypochlorite, calcium hypochlorite, strontium hypochlorite, lithium hypochlorite, sodium hypochlorite and potassium hypochlorite. The most preferred metal salt is lithium hypochlorite.

The tertiary amines useful in this invention are water-soluble amines which contain one tertiary amine group and no other groups which are reactive in the process of this invention. Examples of such amines are trimethylamine, triethylamine, methyldiethylamine, dimethylethylamine, triethanolamine, tripropanolamine, methyldiethanolamine, ethyldiethanolamine, propyldiethanolamine, dimethylethanolamine, diethylethanolamine and the like.

The hypochlorite salt and the tertiary amine are each used in the amount of about 0.25 to about 25 parts by weight per 100 parts by weight of the water-soluble polymer with the preferred amounts being 0.3 to about 1.0 part. Generally, the weight ratio of salt to amine will vary from about 2:1 to about 1:2.

The thickened aqueous fluids to which the hypochlorite salt and tertiary amine are added will have a pH of about 7 to about 12 and, preferably, from about 7 to about 10. The temperature of the system will vary from about 50° F. to about 150° F. The breaker compositions of this invention are particularly useful at a temperature of about 70° to about 100° F.

This invention is described in more detail by the following examples.

EXAMPLE 1

An aqueous fluid was prepared by adding hydroxypropyl guar to water in the amount of 40 pounds per 1000 gallons of water. When hydration was complete and at a pH of 7 and a temperature of 80° F., lithium hypochlorite was added in the amount of 0.5 pounds per 1000 gallons. The viscosity measured on a Fann Model 35A Viscometer at a shear rate of 511 sec.$^{-1}$ 60 minutes after the hypochlorite addition was 11.6 centipoises (cps).

To a similar hydroxypropyl guar aqueous solution were added 0.5 pounds of lithium hypochlorite per 1000 gallons and 0.5 pounds of triethanolamine per 1000 gallons. Fifteen minutes after the addition, the viscosity was 3.6 cps.

EXAMPLE 2

Using the same procedure as described in Example 1, aqueous solutions of hydroxyethyl cellulose, potato starch, crosslinked polyacrylic acid (Carbopol 941 obtained from B. F. Goodrich Company), and anionic polyacrylamide (Polyhall 40J obtained from Celanese Water Soluble Polymers, a division of Celanese Corporation) were treated with lithium hypochlorite and a mixture of lithium hypochlorite and triethanolamine. The viscosity was then measured as described in Example 1. Details of these experiments are set forth in the following table.

BREAK STUDIES OF SEVERAL NATURAL AND SYNTHETIC POLYMERS USING BLEACH AND TRIETHANOLAMINE - 80° F., pH = 7

| Fluid | Active Lithium Hypochlorite (lb/M gal) | Triethanolamine (lb/M gal) | Time/Viscosity Min/cps (511 sec$^{-1}$) |
|---|---|---|---|
| 40 lb/M gal Hydroxypropyl Guar | 0.5 | — | 60/11.6 |
| 40 lb/M gal Hydroxypropyl Guar | 0.5 | 0.5 | 15/3.6 |
| 40 lb/M gal Hydroxyethyl Cellulose | 0.5 | — | 30/30.2 |
| 40 lb/M gal Hydroxyethyl Cellulose | 0.25 | 0.5 | 10/2.4 |
| 5% Potato Starch (W/V) | 1.5 | — | 10/>60 |
| 5% Potato Starch (W/V) | 1.5 | 1.5 | 5/40.8 |
| 20 lb/M gal Carbopol 941 (Polyacrylic Acid) | 4 | — | 30/46.8 |
| 20 lb/M gal Carbopol 941 (Polyacrylic Acid) | 4 | 4 | 2/22.6 |
| 40 lb/M gal Polyhall 40J (Anionic Polyacrylamide) | 0.25 | — | 10/23.4 |
| 40 lb/M gal Polyhall 40J (Anionic Polyacrylamide) | 0.25 | 0.5 | 5/8.2 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A process for reducing the viscosity of aqueous fluids containing natural or synthetic water-soluble polymers selected from the groups consisting of water-soluble derivatives of cellulose, water-soluble polysaccharides, water-soluble derivatives of polysaccharides, polyacrylamide, polymethacrylamide, polyacrylic acid, copolymers of acrylic acid and acrylamide and mixtures thereof which comprises adding the aqueous fluid an alkali metal or alkaline earth metal salt of hypochlorous acid and a water-soluble tertiary amine, which contains one tertiary amine group and no other groups which are reactive in the process wherein about 0.25 to about 25 parts by weight of metal salt and about 0.25 to about 25 parts by weight of tertiary amine are present per each 100 parts by weight of water-soluble polymer.

2. The process of claim 1 wherein about 0.3 to about 1.0 part by weight of metal salt and about 0.3 to about 1.0 part by weight of tertiary amine are present per each 100 parts by weight of water-soluble polymer.

3. The process of claim 1 wherein the alkali metal salt is lithium hypochlorite.

4. The process of claim 1 wherein the tertiary amine is triethanolamine.

5. The process of claim 1 wherein the natural water-soluble polymer is hydroxypropyl guar.

6. The process of claim 1 wherein the synthetic water-soluble polymer is polyacrylic acid.

7. The process of claim 1 wherein the synthetic water-soluble is a copolymer of acrylic acid and acrylamide.

* * * * *